United States Patent [19]

Druce et al.

[11] Patent Number: 5,551,700
[45] Date of Patent: Sep. 3, 1996

[54] PLAYING CARDS FOR AN EDUCATIONAL GAME

[76] Inventors: Harry F. Druce, 3 Roundwood Lane, Harpenden, Hertfordshire AL5 3BW; John M. Druce, 33 Glen Trool Village, Newton Stewart, Wigtownshire DG8 6TO, both of Great Britain

[21] Appl. No.: 244,392
[22] PCT Filed: Oct. 13, 1993
[86] PCT No.: PCT/GB93/02112
    § 371 Date: Sep. 27, 1994
    § 102(e) Date: Sep. 27, 1994
[87] PCT Pub. No.: WO94/08671
    PCT Pub. Date: Apr. 28, 1994

[30] Foreign Application Priority Data

Oct. 14, 1992 [GB] United Kingdom ............... 9221535
Sep. 20, 1993 [GB] United Kingdom ............... 9319387

[51] Int. Cl.[6] ........................ A63F 1/00; A63F 9/18; A63F 3/00
[52] U.S. Cl. ............... 273/296; 273/299; 273/302; 273/303; 273/431; 273/308; 273/243
[58] Field of Search ............ 273/249, 243, 273/296, 302, 303, 304, 305, 306, 308

[56] References Cited

U.S. PATENT DOCUMENTS

| D. 59,761 | 11/1921 | McCarthy | D21/43 |
|---|---|---|---|
| 4,121,823 | 10/1978 | McBride | 273/249 |
| 4,124,214 | 11/1978 | Pavis | 273/249 |
| 4,273,337 | 6/1981 | Carrera et al. | 273/243 |
| 4,315,627 | 2/1982 | Schlegel et al. | 273/249 |
| 4,355,812 | 10/1982 | McCullough | 273/248 |
| 4,443,012 | 4/1984 | Makovic et al. | 273/292 |
| 4,714,255 | 12/1987 | Henry et al. | 273/249 |

FOREIGN PATENT DOCUMENTS

| 2134801 | 8/1984 | United Kingdom | 273/239 |
|---|---|---|---|
| 2163663 | 5/1986 | United Kingdom | 273/244 |
| 2191412 | 12/1987 | United Kingdom | 273/242 |

OTHER PUBLICATIONS

What's the Word, Karian Corporation, 1984.

*Primary Examiner*—Benjamin H. Layno

[57] ABSTRACT

The invention is a pack of playing cards used for playing an educational game comprising a plurality of cards. The cards are divided into several sets of cards. Each set depicts a different face of a multifaced die, wherein all the cards in one set have the same die face, while cards in different sets have different die faces. The cards are also divided into several suits. Each card has a front face and a rear face. Disposed on the front face of each card is at least one question, an answer to the question, and the depiction of a die-face. Disposed on the rear face of each card is a depiction of a suit and a number. The cards are numbered sequentially in each suit. The cards may be used to replace dice in a board game which normally uses dice to move playing piece along a game board track.

18 Claims, 2 Drawing Sheets

5,551,700

PLAYING CARDS FOR AN EDUCATIONAL GAME

TECHNICAL FIELD

The invention relates to a pack of playing cards for an educational game. The game may be of especial interest for children, although it may also be played by adults.

BACKGROUND ART

The need for encouraging children to learn is well-known, and to this end a number of games have been devised over the years. Many such games involve the use of cards which carry questions for the child to answer. Particularly well-known are so-called flash card games in which the front face of a card carries a question for the child to answer. Such questions may be in the form of a straightforward question, an arithmetical problem such as 4+7=?, or a picture of an object which the child has to spell. Other card games are known in which the front face of the card bears both the question and the answer. With such games the question is read to the child by another person, the card face only being shown to the child after he has answered.

Unfortunately in such games the 'educational' content is very high and the 'game' content is low, with the result that the child becomes bored and loses interest. The need therefore is for the 'game' content to be increased so that the child is keen to continue, and it is to this end that the present invention is directed.

Most children are familiar with so-called "die-and-track" games. In such games a board is provided on which is printed a track of sequential rectangles leading from a "start" position to an "end" position. Each player in the game has an identifying piece, such as a coloured disc, which can be placed in a rectangle on the track. The player throws a die and his identifying piece is moved along the track by the number of rectangles equal to that shown on the upper face of the die. "Ludo" and "Snakes and Ladders" are well-known examples of such a game. Such die-and-track games are both very familiar and very popular. The present invention provides an arrangement whereby for such a game the die is replaced by cards bearing the depiction of a die face, and a player is required to answer a question on the card before he can advance his piece.

DISCLOSURE OF THE INVENTION

According to the invention a pack of playing cards for an educational game comprises a plurality of cards, each card having a front and rear face, each card having disposed on the front face thereof at least one question, and each card having disposed thereon the answer to the (or each) question, and each card having disposed thereon a depiction of a die-face.

Preferably the pack of cards comprises a plurality of sets of cards, each set depicting a different face of a multifaced die. Thus, for example, 48 cards might be divided into six sets of eight cards, the first set bearing the die face "1", the second set bearing the die face "2", and so on through the sets so that the sixth set bears the die face "6". The six sets are therefore appropriate to a normal six-faced die. Naturally, further sets might be provided as appropriate of a multi-faced die having more than six faces is used. In this description if the word die (dice) is used without qualification it is to be understood that a normal cubic six-faced die (dice) is intended.

Conveniently the questions of any pack relate to one educational aspect or discipline, such as arithmetic, spelling, history, general knowledge, and so on. Packs of cards carrying questions appropriate to adults may also be provided.

Preferably a full complement of cards comprises a number of packs of cards, each pack relating to a different aspect or discipline. For example, in each full complement of cards there may be four packs of cards relating to arithmetic, spelling, history and general knowledge respectively, the cards in each pack being identified by these words or the letters A, S, H and K respectively.

Preferably, each card carries a plurality of questions of different degrees of difficulty appropriate to players of different ages or abilities.

Preferably also, the question(s) and answer(s) are disposed on one face of the card. The depiction of the die-face may be on this side also, or it may be on the opposite face.

For convenience in this specification the side of the card on which the question(s) appears shall be regarded as the "front" face of the card, and the other side shall be regarded as the "rear" face.

The presentation of a question and answer on a card may be implicit rather than in direct form. For example, in a pack of cards directed to the subject "Rivers of the World" a card bearing the words:

PARIS–SEINE would imply the question "What is the main river flowing through Paris"? to which the correct answer is "The Seine".

Again, in a pack of cards directed to spelling, the word itself gives both question and answer, for example, the word BLEACH implies the question "How do you spell Bleach"?, and gives the answer B L E A C H.

MODES FOR CARRYING OUT THE INVENTION

First Embodiment

A first embodiment will now be described with reference to FIGS. 1–4 of the drawings.

Figure 1:
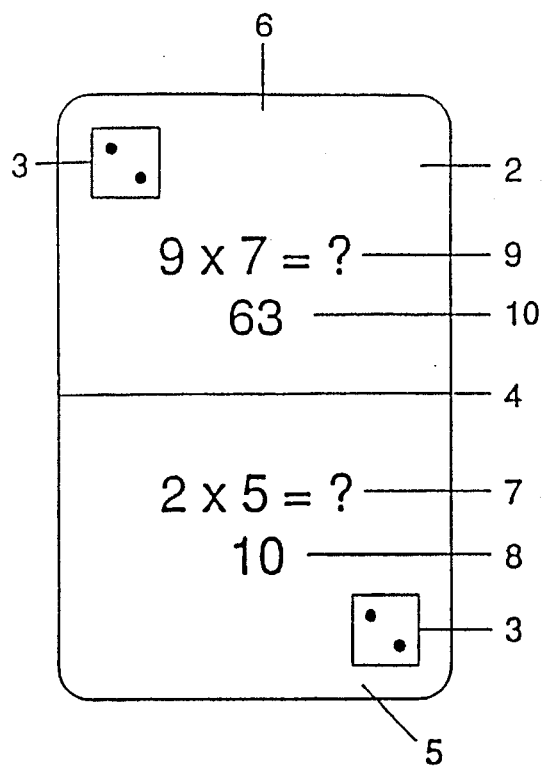
FIG. 1 represents a front face of a card according to one embodiment of the invention.

As shown in FIG. 1 a card 1 in a pack of cards according to the invention has a front face 2 on which is depicted a face 3 of a six-faced die, the face 3 indicating the die count "2". The card is divided by a line 4 into two sections 5, 6, which may be printed in different colours. Printed within the section 5 is an "easy" arithmetical question 7 and its answer 8, and within the section 6 is a "hard" arithmetical question 9 with its answer 10.

The card 1 of FIG. 1 belongs to a first set of eight cards all of which depict the die face for die count "2", and all of which carry different easy and hard questions.

Figure 2:
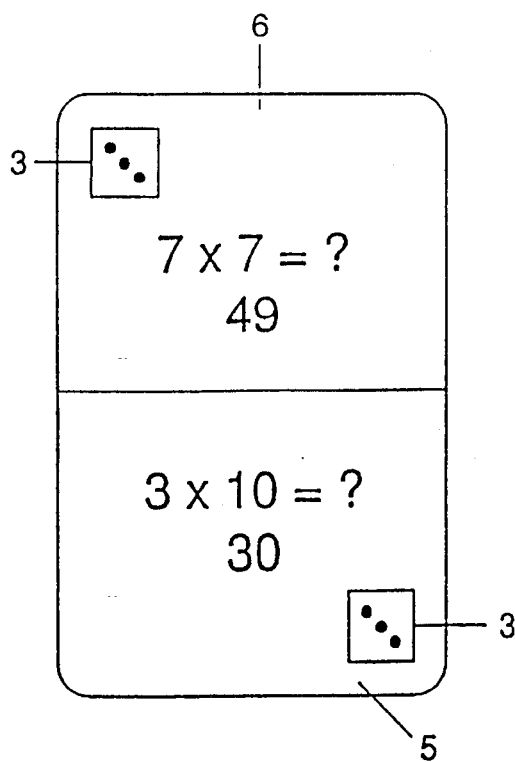
FIG. 2 represents the front face of a different card in the same pack.

FIG. 2 shows a card similar to that of FIG. 1 but belonging to another set of eight cards all depicting the die-face "3". Again, easy and hard questions are printed on each card together with their answers. Six sets of eight cards relating to the six faces of a standard six-faced die are provided to make up a pack of 48 cards all relating to the dicscipline of arithmetic. Naturally the questions and answers differ from card to card.

The 48 cards relating to arithmetic are all identified by a common marking which may be the letter "A" printed at any convenient place on the card.

Figure 3:
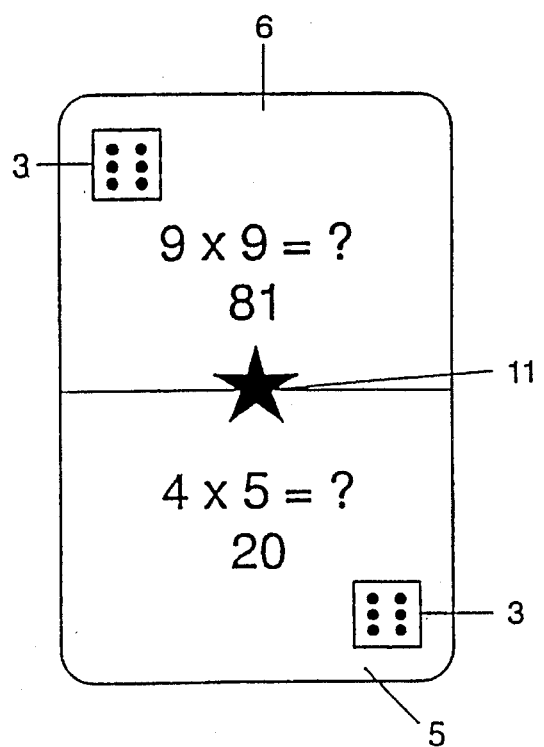
FIG. 3 represents the front face of yet another card in the same pack.

FIG. 3 shows one of two cards in the set of cards carrying the die face "6" which differs from the others in that a star 11 is drawn in the middle of the front face. The purpose of this "star card" will be explained hereinafter.

Figure 4:
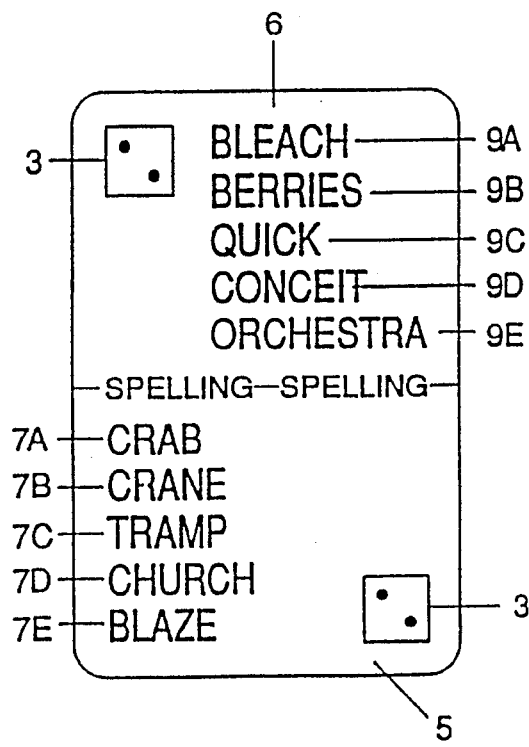
FIG. 4 represents the front face of a card in a different pack.

FIG. 4 shows the front face of a card in a 48-card pack directed to spelling. The bottom half 5 contains 5 'easy-to-spell' words 7A to 7E, and the top half 6 contains 5 'hard-to-spell' words 9A to 9E. Each card depicts at 3 a die-face, there being 8 cards for each of the six faces of a die. Two of the cards bearing die-face 6 carry a star similar to that shown in FIG. 3.

Mode of play. The cards may be used to replace the die used in any 'single-die' die-and-track game, such as ludo or snakes and ladders. By way of example one may consider the cards of the invention being used in such a game by a group of children of two different age groups. The cards are shuffled and stacked front face downwards on the table. If the cards have a plurality of questions in each of the "easy" and "hard" sections, as in FIG. 4 where there are 5 questions in each section, a decision is then made as to which of the first, second, third, and so on, questions are to be valid for that game. If, for example, the decision is that the second questions are to be valid, then, for that game, the first, third and subsequent questions are ignored. The first player takes the top card from the pile and passes it unseen to another player, or to a game supervisor such as a parent, who reads either the easy question or the hard question according to the age or ability of the player. If the player answers correctly he is told the die count on that card and may move his identifying piece forward on the track by that number of spaces. Otherwise he does not move, and the question is passed to the next player who has the opportunity to answer that question. When the question has been either (a) answered correctly or (b) incorrectly answered by all of the players the card is then returned to the bottom of the pack and the turn then passes to the next player who takes the next card from the top of the pile. The same procedure is then followed and this is continued player by player until one player reaches the winning position of the particular die-and-track game being played. The cards are shuffled frequently to ensure random probabilities.

It will be apparent that both the die number on the card and the correct answering of the question together correspond to the die throw of a standard die-and-track game.

The "star cards" mentioned heretofore provide an elaboration whereby if a child correctly answers the question on this card he moves an additional six places, and if he fails he moves back six places.

Whilst as described above the cards have been used with the boards of known die-and-track games it is dear that a board carrying a track specially dedicated to a learning game may be provided.

The cards described above are very versatile and may be used for games other than "die-and-track" games, for example, games simulating sporting activities. One such game is cricket. In this the players are divided into two teams A and B, and it is convenient to consider A to be the team bowling and B the team batting. The cards are shuffled and stacked with the front (question) side downwards. A player in team A picks the top card and "bowls" the question to the first player in team B. If he answers correctly he scores runs equal to the number depicted on the die-face (1–6) of that card, whereupon the bowler picks the next card and "bowls" a second question. Play continues until the player fails to answer a question correctly, whereupon that player is "out" and the next player in team B takes his place. When all team B are out they become the bowling team and team A the batsmen. The team scoring the most runs wins.

Instead of single-wicket cricket as just described double-wicket cricket may be played. In this two members of the batting side are "in" at the same time. If the batsman taking strike scores an odd number of runs his partner receives the next question. If he scores an even number he retains the strike.

The cards may be used for a variation on the game of "Pairs" or "Fish". In this the cards are shuffled and spread front face downwards over a table without overlapping. Each player in turn selects two cards and turns them over. If he has selected a pair having the same die-count he retains the cards and selects another pair; if not he replaces the cards front face downwards in their original positions and the turn passes to the next player. Play continues until all the cards have been retained by one or other of the players. All the cards retained by a player are fanned out in front of him with the front faces downwards. The second stage of the game now begins. The player with the most cards (call him A) has the first turn. The game supervisor (or the person on A's right) selects one of the A's fan of cards and reads the question to him. If A answers correctly he receives the card to place in his "store". The supervisor selects another card from A's fan and reads this. If answered correctly this too goes in A's store, and this continues until A fails to answer a card correctly. This card is then placed face-down to start a "pool" of cards on the table. The turn then passes to the player B on A's left. Again the supervisor asks the questions on cards selected from B's fan, and these are "stored" when correctly answered. If incorrectly answered the card is added to the pool, and the turn passes to the next player. Play continues in this way round the table. Should any player be without 'fanned' cards a card from the pool (which is frequently shuffled) is selected. If this is answered correctly it is stored by the player, and the question from another pool card is put to him, his turn ceasing at an incorrect answer. Eventually all the fanned cards will have been either stored or placed in the pool; at this stage play continues with the pool cards until all these have been correctly answered and stored. Each player counts up the die values of his stored cards, the winner being the one with the highest total.

Figure 5:
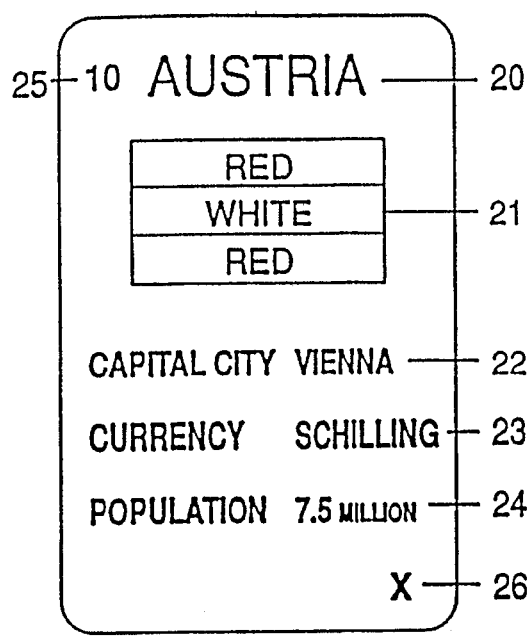
FIG. 5 represents the rear face of a card.

In the 48-card packs of cards described above the rear faces of the cards have not been utilised. However, the rear faces may be used for other educative games. FIG. 5 show the rear face of a card for such a game. The 48 cards are divided in four "suits", these being the four countries Austria, Switzerland, Poland and Denmark. The name 20 is printed at the top of the card, and below this there is a depiction of the national flag 21, and the name of the capital city 22, the currency 23, and an indication of the population 24. The cards in each suit are numbered from 1 to 12 in Arabic numerals at 25 and Roman numerals at 26.

These cards may be used for playing a game analogous to "rummy" in which seven cards are dealt to each player and the rest are stacked with the "country" face downwards to form a stock. The first player takes the top card from the stock and discards that card or a card from his hand onto a "discard" stack "Country" face upwards, his object being to change the cards in his hand until it contains a set of three cards and a set of four cards, the cards a set being consecutive cards of the same country or cards of the same value of different countries. The next player then takes the top card from either the unseen stock or the discard stack and discards either that card or a different card from his hand. The players take turns in sequence until one player is successful and is "out", whereupon the values of the cards not forming a set held by the other players are totalled and recorded as a score against them. Play continues through a predetermined number of deals, the winner being the player with the lowest score at the end.

An important feature of these "double-sided" cards is that they provide for subliminal learning. When one side of the cards is the "playing side" the non-playing side is being continously exposed to the players, and the information thereon is being unconsciously absorbed. Thus while children are using the cards in a "die-and-track" game they will unknowingly be taking in information about the countries Austria, Switzerland, Poland and Denmark from the rear faces of the cards.

Whilst as described the rear faces of all the cards of a particular country are identical except for the number, it is dear that different cards may carry different information about that country. Thus 48 facts about a country may be presented on its 12 cards.

It is also clear that the four countries on the rear of a pack whose main subject is "Spelling" may differ from the countries on a "Arithmetic" pack, and so on, so that in a complement of six companion packs a total of 24 countries may be covered.

It will be dear that the rear faces of the cards such as that shown in FIG. 5 could be provided with die-faces. In such a pack there is provision for two die-and-track games, one using the front faces of the cards and the other using the rear faces.

Second Embodiment

In the first embodiment described above the cards are suitable as a replacement for the die in single-die die-and-track games. In such games the pack must contain the same number of cards for each die-face. As described above there are 8 cards per die-face, but 9, 10 or other numbers per die-face would be suitable. However, many games such as Monopoly (Trade Mark) and Cluedo (Trade Mark) require two dice, and to replace the dice in such games demands a different card arrangement.

As shown in FIG. 1, a die-face 3 is depicted twice in opposite corners of the front face of a card. The two depictions carry the same die count '2', these two being merely two depictions of a single die face. In the arrangement described the pack of cards is designed for games in which only a single die is used, this giving die counts of '1' to '6'.

Figure 6:
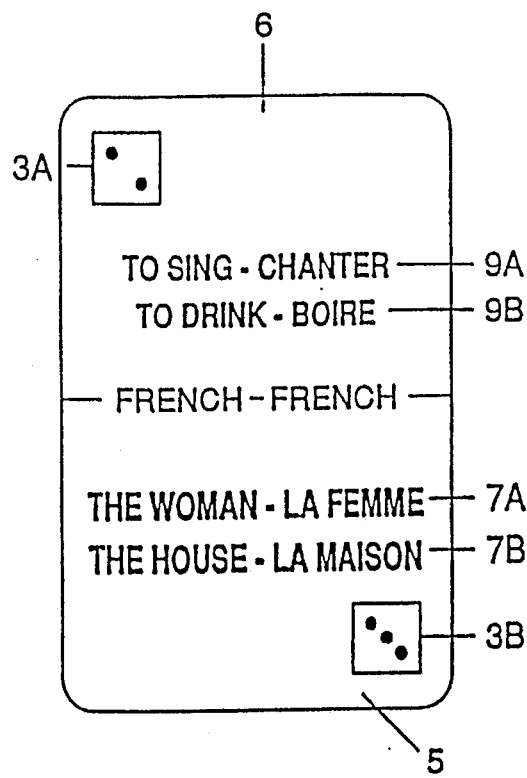
FIG. 6 represents the front face of a card of a second embodiment.

However, in a second embodiment of the invention as shown in FIG. 6 the two depictions 3A and 3B in opposite corners of the card represent the die counts of two individual dice, and are equivalent to the throw of a pair of dice in a two-die game. The invention embraces, therefore, a pack of playing cards in which each card bears, in addition to at least one question and answer, the depictions of the faces of two dice, the cards in the pack providing depictions representative of all possible throws of a pair of dice. In this respect, in order that the probabilities correspond to those using two separate dice, 36 cards are required, i.e. one card with dice 1:1, two cards with 1:2, one card with 2:2, two cards with 1:3 and so on. A pack, therefore, must comprise 36 cards or a multiple thereof. As shown in FIG. 6 the subject of the pack is French, and in each of the easy and hard sections, 5 and 6 respectively, there are two English words with their French translations. Naturally, the questions 7A, 7B, 9A, 9B, may be asked in either direction.

It will be clear that in either of the embodiments described above when a card carries a plurality of questions these may be of differing degrees of difficulty. Thus as described with reference to FIGS. 1, 2, 3, 4, 6 and 8, each card cartries one or more "easy" questions in a lower section 5, 105, and one or more "difficult" questions in an upper section 6, 106. (It is immaterial whether the easy questions are in the top section and the difficult questions are in the bottom section or vice versa provided there is consistency throughout the pack)

Figure 7:
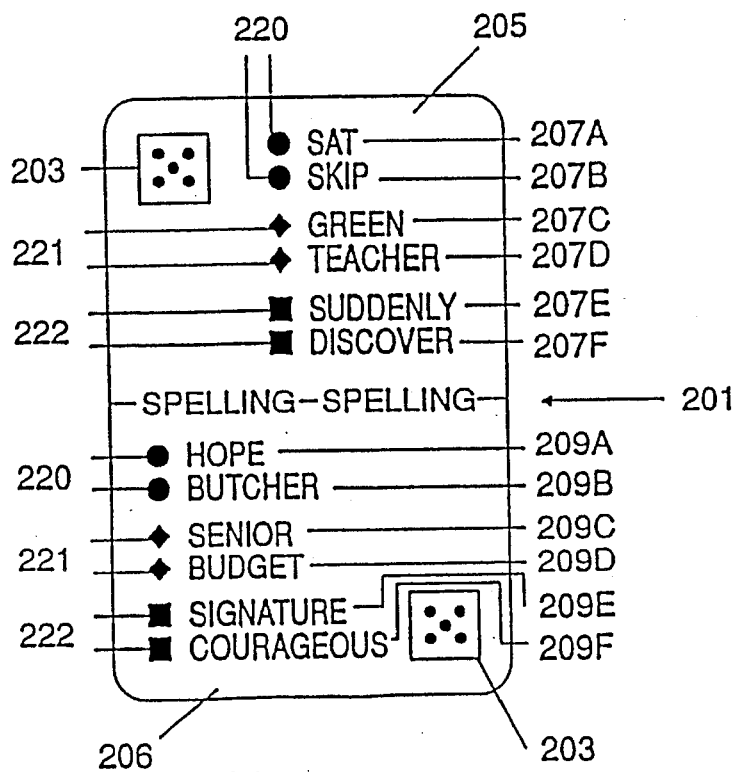
FIG. 7 represents the front face of a modification of the card of FIG. 4.

However, it is also clear that the provision of Just two grades, "easy" and "difficult" may not be adequate. FIG. 7, which is in a pack directed to Spelling, shows an arrangement wherein symbols are provided to increase the grades of difficulty. The card 201 has a front face on which a die-face 203 is depicted, and is divided into an upper "easy" section 205 suitable for younger or less able players, and a lower "more difficult" section 206 for older or more able players. In the upper section are six questions 207A to 207F. The two questions 207A and 207B are accompanied by a symbol 220 in the form of a circle indicating an easy question. The questions 207C and 207D are accompanied by a symbol 221 in the form of a diamond indicating a question of average difficulty, and the questions 207E and 207F are accompanied by a symbol 222 in the form of a square indicating a question of more than average difficulty. Thus within the upper "easy" section there are "easy", "average" and "hard" questions indicated by circles, diamonds and squares respectively.

Similarly in the lower "hard" section there are questions 209A to 209F categorised as "easy", "average" and "hard" by the provision circles 220, diamonds 221 and squares 222 respectively.

Clearly there may be an overlap in the degree of difficulty such that the most difficult questions (squares) in the "easy" section 205 may be more difficult than the easiest questions (circles) in the "hard" section 206. Alternatively there may be a progressive increase in the degree of difficulty.

It will be apparent that further symbols, for example, cresses, stars, ovals, and the like, may be provided to increase the levels of difficulty, and that the division into easy and hard sections may be avoided, a single continuum of difficulty in the questions being provided.

The use of symbols as just described to indicate the degree of difficulty of the questions on cards may be applied to any of the embodiments and modifications described in the specification.

Numerous modifications and variations will be apparent to one skilled in the art without departing from the scope of the invention.

We claim:

1. A pack of playing cards for an educational game, comprising:

a) a number of sets of cards exactly equal to the number of faces on a die, each card having a front and rear face;

b) each card having disposed on said front face at least one question and answer;

c) each card having disposed thereon a depiction of at least one die-face;

d) each card of each set having disposed thereon the depiction of the same die-face, the die-face being different in each set, and there being equal numbers of cards in each set, such that said cards are adapted for replacing the die in a die-and-track game, whereby a player correctly answering the question gets to move based on the number represented by said die-face; and e) each card belonging to one of a number of suits of cards, and said cards in each suit are numbered sequentially on said rear face.

2. A pack of playing cards as in claim 1, wherein:

a) said number of sets of cards is exactly six, the cards of each set carrying the depiction of the same die-face, the die-face being different in each set, and there being equal numbers of cards in each set, such that said cards are adapted for replacing a six-faced die in a single-die die-and-track game.

3. A pack of playing cards as in claim 2, wherein:

a) each set has eight cards, each set depicting a different one of the six die-faces of a six-faced die.

4. A pack of playing cards as in claim 1, wherein:

a) said rear faces of all the cards in a suit are identical except for the number thereon.

5. A pack of playing cards as in claim 1, wherein:

a) said rear faces of all the cards in a suit differ from one another by a different number and by a different word disposed thereon.

6. A pack of playing cards as in claim 1, wherein:

a) said rear faces of all the cards in a suit differ from one another by a different number and by a different picture disposed thereon.

7. A pack of playing cards as in claim 1, wherein:

a) the number of suits is four, and the number of cards in a suit is twelve, and said front faces of said cards comprise six sets of eight cards, each set depicting a different one of the six die-faces of a six-faced die.

8. A pack of playing cards as in claim 1, wherein:

a) each card has the question and answer and the depiction of the die face on the same face of the card.

9. A pack of playing cards as in claim 1, wherein:

a) each card carries a plurality of questions.

10. A pack of playing cards as in claim 9, wherein:

a) each card carries at least one easy question and at least one difficult question.

11. A pack of playing cards as in claim 10, wherein:

a) a symbol is provided alongside at least one question on each card to indicate the degree of difficulty of that question.

12. A pack of playing cards as in claim 11, wherein:

a) each symbol is selected from the group consisting of circles, diamonds, squares, crosses, stars and ovals.

13. A pack of playing cards as in claim 9, wherein:

a) each card carries a plurality of easy questions and a plurality of hard questions.

14. A pack of playing cards as in claim 13, wherein:

a) a symbol indicating the degree of difficulty is provided alongside each question on each card.

15. A pack of playing cards as in claim 1, wherein:

a) the questions on all of the cards relate to one educational discipline.

16. A pack of playing cards for an educational game, comprising:

a) a plurality of exactly N*36 cards, where N=1, 2, 3, . . . N, each card having a front and rear face;

b) each card having disposed on said front face at least one question and answer; and c) each card having disposed thereon a depiction of two individual six-faced dice, the die-faces depicted thereon representing the 36 different combinations of die-faces obtainable by throwing a pair of six-faced dice, such that said cards are adapted for replacing the dice in a two-die die-and-track game, whereby a player correctly answering the question gets to move based on the numbers represented by said two die-faces.

17. A pack of playing cards for an educational game, comprising:

a) a number of sets of cards equal to the number of faces on a die, each card having disposed thereon a depiction of at least one die-face, the cards of each set all carrying the depiction of the same die-face, the die-face being different in each set, and there being equal numbers of cards in each set, each card having a front and rear face;

b) each card having disposed on said front face thereof at least one question and the answer to the question, whereby a user correctly answering the question gets to move based on the number represented by said die-face; and c) the rear faces of the cards carrying identification to indicate that each card belongs to one of a number of suits of cards, and the cards in each suit are numbered sequentially on the rear face.

18. A pack of playing cards for an educational game, comprising:

a) a number of sets of cards exactly equal to the number of faces on a die, each card having a front and rear face;

b) each card having disposed on said front face at least one question and answer;

c) each card having disposed thereon a depiction of at least one die-face;

d) each card of each set having disposed thereon the depiction of the same die-face, the die-face being different in each set, and there being equal numbers of cards in each set, such that said cards are adapted for replacing the die in a die-and-track game, whereby a player correctly answering the question gets to move based on the number represented by said die-face; and e) each card belonging to one of four suits of cards, the number of cards in a suit is twelve, and said front faces of said cards comprising six sets of eight cards, each set depicting a different one of the six die-faces of a six-faced die.

* * * * *